2,887,719

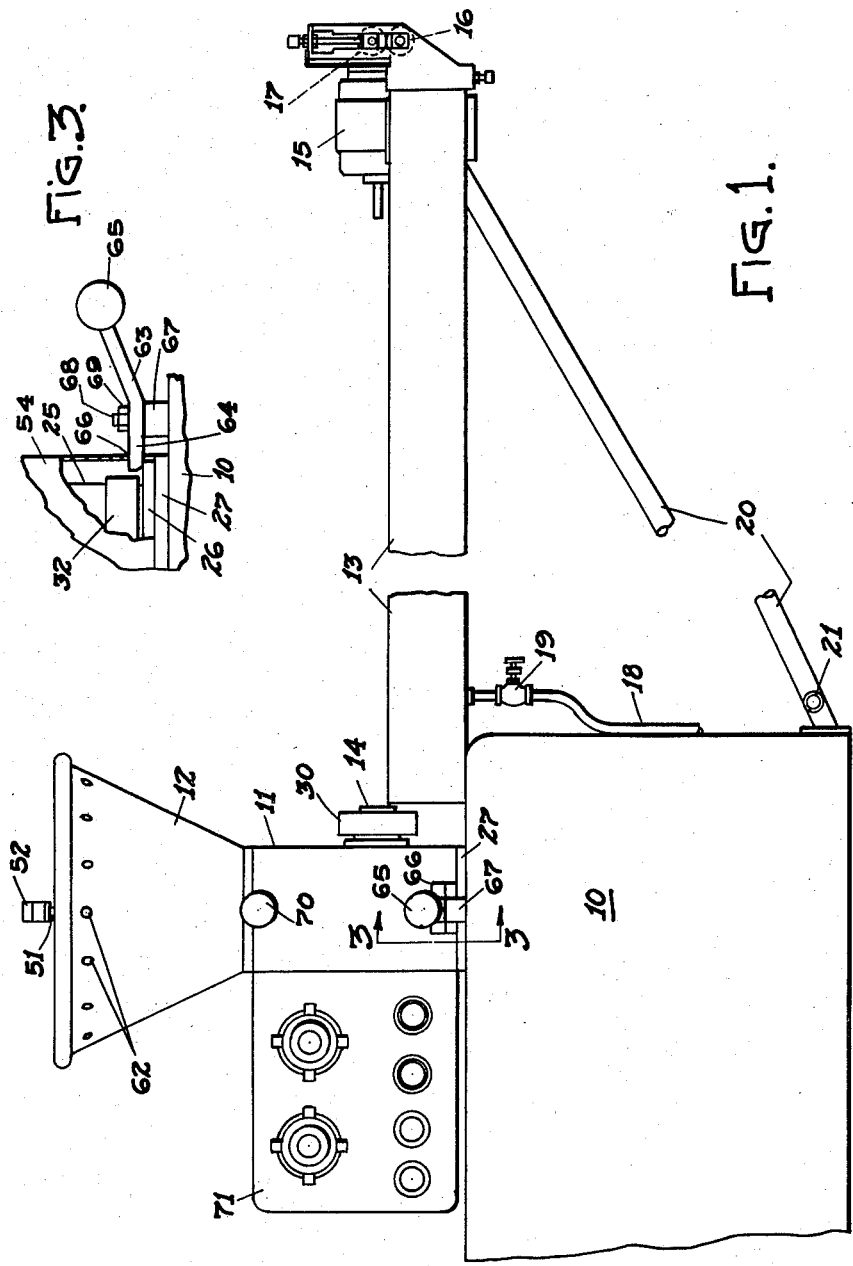

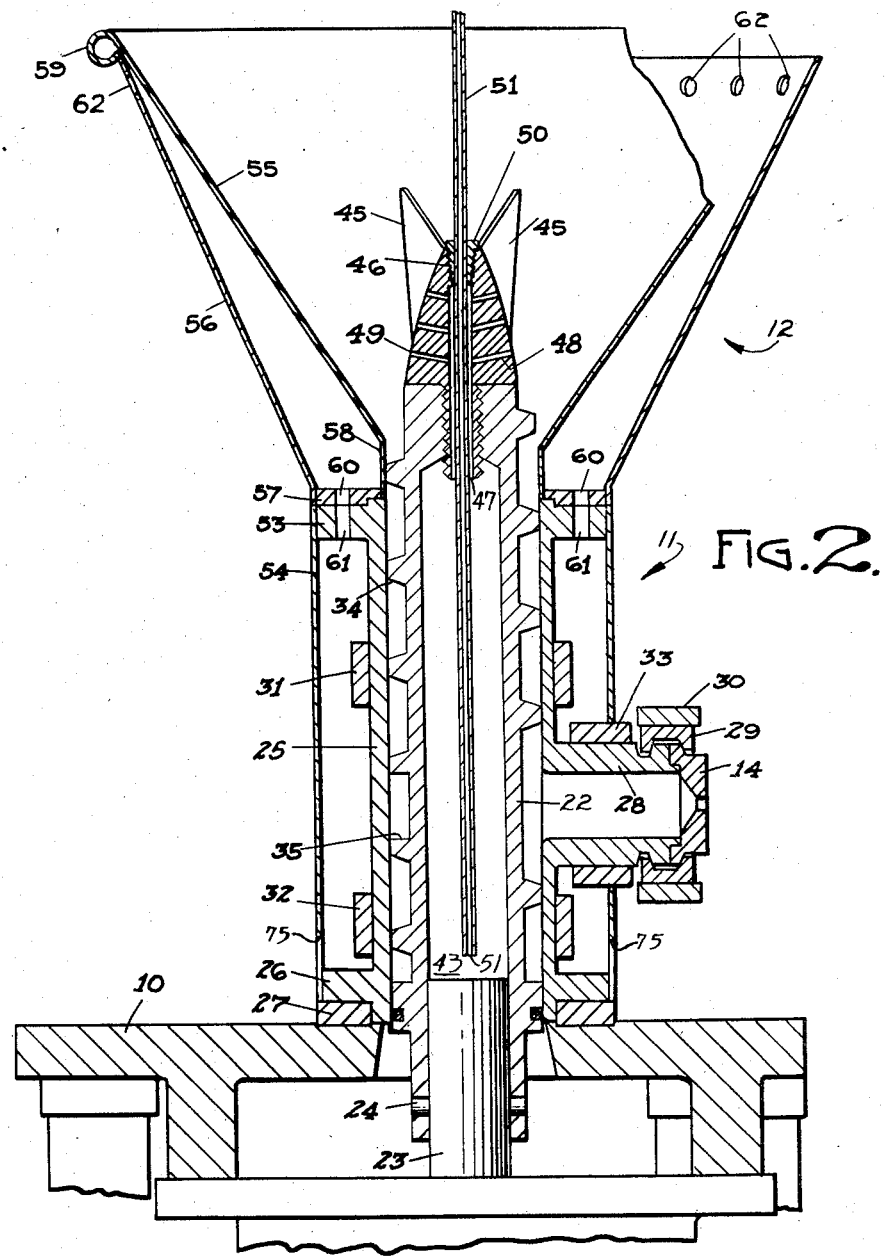

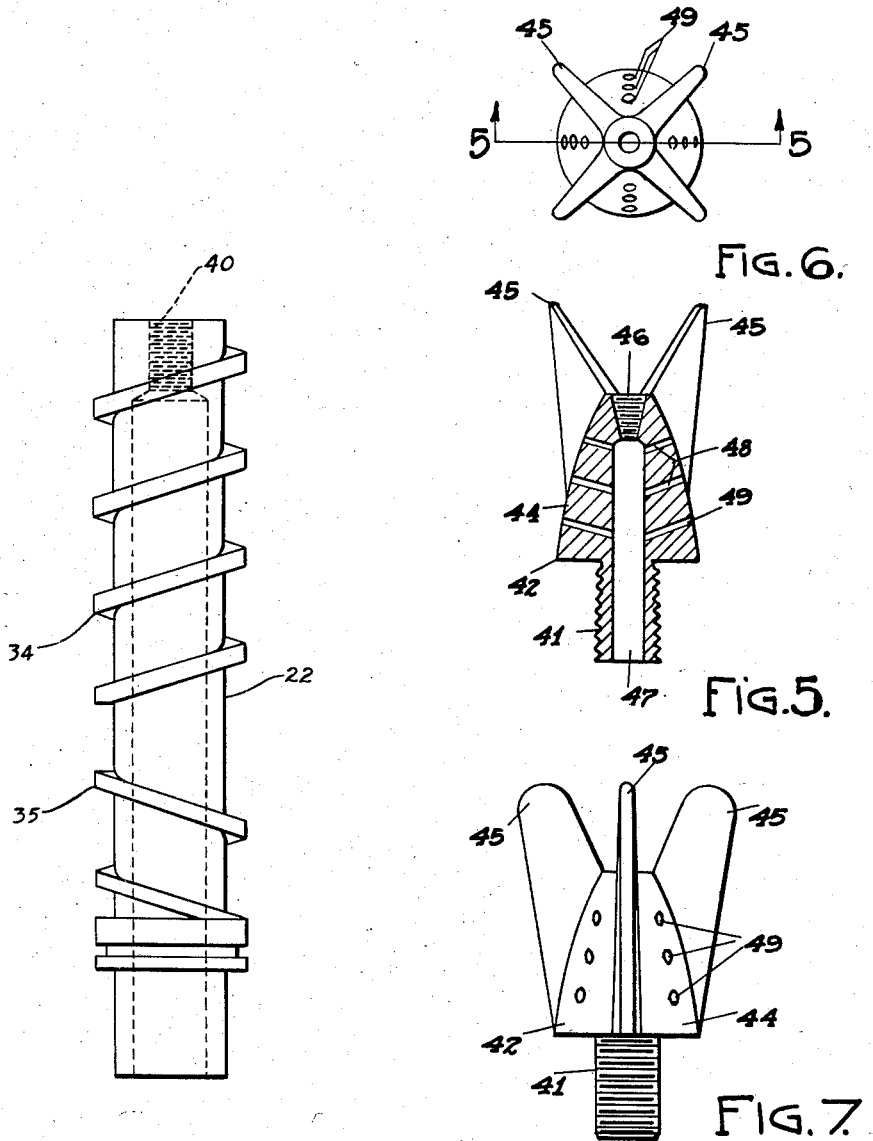

APPARATUS FOR PLASTICIZING A SOLID PARTICULATE MATERIAL FOR EXTRUDING OR MOLDING

Harold Corbett, Worcester, Mass., assignor, by mesne assignments, to Package Machinery Company, East Longmeadow, Mass., a corporation of Massachusetts Application May 16, 1957, Serial No. 660,025

7 Claims. (Cl. 18—12)

This invention relates to an apparatus for plasticizing a solid particulate material. Plastic material discharged by the device of this invention may be directly fed to an extruder or, employed as a feeding mechanism for an injection molding operation. This application is a continuation in part of my copending application Serial No. 583,757, filed May 9, 1952, now abandoned.

In most conventional plastic extruders the raw plastic material is fed to a hopper in solid and particulate form. From the hopper, the material is fed to a treating chamber where it is plasticized by being heated, mixed and compressed. The resulting melted or fused material is then forced outwardly (extruded) from an orifice at the terminal end of the heating and mixing chamber. Conventionally, in these extruders, the treating chamber is horizontally disposed with the vertical hopper being located near one end of the chamber. Therefore, the plastic material travels in a vertical direction through the hopper and in a horizontal direction through the heating chamber. Such conventional extruders lack efficiency in plasticizing the particulate material and are relatively complicated, bulky and space consuming.

In molding many plastic materials the presence of moisture creates many problems and, if not thoroughly eliminated, results in the molded product being unacceptable for use or sale. Moisture elimination is of such importance the use of expensive and relatively complicated machines have been employed to separate moisture and vapors from the plastic material as it is being prepared for a molding operation. Other molders have predried their material in ovens and then protected it from reabsorbing atmospheric moisture until the molding operation can be completed.

One object of this invention is to provide an improved apparatus for plasticizing a solid particulate material for an extruding or molding operation, which apparatus is relatively simple in construction, compact and highly efficient in reducing particulate plastic material to a fused or moldable state.

The above and other related objects and features of the invention, will be apparent from a reading of the following description of the disclosure found in the accompanying drawing and the particular novelty thereof pointed out in the appended claims.

In the drawings:

Fig. 1 is a view in front elevation of an extruding machine embodying the present invention;

Fig. 2 is an enlarged vertical sectional view of the plasticizing apparatus incorporated in the extruding machine shown in Fig. 1;

Fig. 3 is an enlarged sectional view taken along section line 3—3 of Fig. 1 showing the clamping lugs for the plasticizing barrel;

Fig. 4 is an enlarged view in front elevation of the feed screw itself, minus the cap;

Fig. 5 is a sectional view taken along section line 5—5 of Fig. 6 showing the cap which is attached to the top of the feed screw shown in Fig. 4;

Fig. 6 is a plan view of the cap shown in Fig. 5; and

Fig. 7 is a view of the cap taken on an elevation 45 degrees removed from the line 5—5 of Fig. 6.

Referring to the drawings in detail, in Fig. 1 the numeral 10 designates a base or housing in which is mounted a suitable drive mechanism (not shown). A vertical plasticizer 11 having a hopper 12 is mounted on the upper surface of the housing 10. An elongated water trough 13, having an open top, is situated to the right of the extruder orifice 14. At the extreme right-hand end of the water trough 13 a motor 15 drives a lower roller 16 (shown partly in dotted lines). An upper weighted roller 17 rests against roller 16 so as to be driven by surface contact therewith. Circulating cooling water is introduced to the trough 13 by means of pipe 18 and shut-off valve 19. At the right-hand end of the trough, water is removed through water drains 20 and 21; water drain 20 also forms part of the supporting structure for the right-hand end of the trough.

Referring now to Fig. 2, the plasticizing apparatus 11 includes a hollow and rotatable vertical feed screw shaft 22 which is coupled at its lower end to a drive shaft 23 by means of a pin 24. Screw 22 is rotatably mounted within a cylindrical barrel 25 whose lower flanged portion 26 rests upon a complementary seating ring 27 attached to the housing 10. At the right-hand side of barrel 25, and at a location spaced upwardly from the bottom thereof, is a discharge port which takes the form of an outlet pipe 28 integral with the barrel 25. The extruding orifice or die 14 is held against the right-hand end of the outlet 28 by means of a split clamp 29 and an adjustable holding strap (or heater band) 30. The latter strap 30 has a heater element imbedded therein for the purpose of maintaining the orifice member 14 at the required temperature. Additional heater bands 31 and 32 surround the barrel 25 at locations above and below outlet 28, respectively. Another heater band 33 also surrounds the outlet pipe 28 between the barrel 25 and the heater band 30.

The feed screw 22 (see Figs. 2 and 4) has upper convolutions 34 which may be referred to hereinafter as the screw flight 34 and it also has lower convolutions 35 of opposite hand which may be referred to hereinafter as the reverse screw flight 35. The flights 34, 35, although opposed, are formed with the same angle or pitch, this is of importance in neutralizing the thrust imparted to shaft 22 when it is rotated to discharge plastic through the outlet pipe 28 thus minimizing the loading on the shaft bearing. The two screw flights 34 and 35 are spaced apart along the screw and barrel at the discharge port 28 and cooperate with the screw body and barrel to define a mixing chamber where the plastic material will be folded back on itself and kneaded before being discharged through the outlet pipe 28. This particular action has been found highly effective in reducing the plastic material to a substantially whole plastic or fused moldable state in the relatively short distance illustrated. It will also be noted that preferably the upper flight 34 terminates above or coextensively with the upper end of the discharge port 28 while the lower flight 35 terminates below or coextensively with the lower end of the discharge port 28. With this arrangement the fused plastic will be uniformly discharged without any undesirable pulsating.

The upper end of feed screw 22 has a threaded hole 40 (Fig. 4) for receiving the complementary threaded portion 41 of a head or cap member 42 (Fig. 5). An enlarged cylindrical cavity 43 extends within the feed screw from the lower end of the threaded hole 40 to the bottom end of the feed screw. The lower end of the cavity 43 is closed by the drive shaft 23.

Referring now to Figs. 5, 6 and 7, the cap member 42 has a hollow bullet-shaped body portion 44 and a lower reduced threaded portion 41, as referred to above. Four vertical agitator vanes 45, equally spaced from each other, project upwardly from the surface of the body portion 44. At the top of the cap a tapered threaded hole 46 is provided for receiving a correspondingly tapered plug, as will hereinafter appear. Below the threaded hole 46, an elongated cylindrical bore 47 extends from the hole 46 to the lower end of threaded portion 41. A series of small channels 48 extend substantially radially outward from bore 47 to the outer surface of the cap, forming rows of outlet ports 49 at positions between the vanes 45.

Returning now to Fig. 2 a tapered threaded plug 50 is adapted to screw into threaded hole 46 of the cap 42. An elongated hollow tube 51, passing through a hole in the plug 50 and welded to the same, extends from above the center of the hopper 12 through bore 47 and into the cavity 43 of the feed screw 22. The lower end of this hollow tube 51 terminates short of the drive shaft 23. A hollow swivel-type adaptor 52 (see Fig. 1) is attached to the upper end of the tube 51 to permit easy connection to a source of air pressure (not shown).

The upper portion of barrel 25 is provided with a circumferential flange 53 substantially equal in size to lower flange 26. A relatively thin casing 54, provided with suitable holes for any projecting parts, fits around upper and lower flanges 53 and 26, respectively, so as to form an annular space with the outside of the barrel 25.

The feed hopper 12 is composed of inner and outer hopper members 55 and 56, respectively, between which is an upwardly tapering annular space. Outer hopper member 56 is attached at its lower end to an annular ring 57 which seats on the annular flange 53. These two annular members are held together by suitable screw means, not shown. The inner hopper 55 has a lower cylindrically shaped portion 58 whose inner diameter is substantially equal to the outer pitch diameter of the screw flight 34. The lower edge of this cylindrical portion 58 fits within the annular ring 57 and against the upper surface of annular flange 53. Inner hopper 55 has an upper curled edge 59 which fits over the upper edge of outer hopper 56 to close the latter. The upper edges of the two hopper members may be fastened together by screws, if desired.

Correspondingly situated holes 60 and 61 are provided in the ring 57 and the flange 53, respectively, at various locations around the circumference of the latter members for permitting communication between the upper and lower annular spaces. A plurality of circumferentially spaced holes 62 are formed in the outer hopper member 56 at a position below the upper edge thereof.

As shown in Fig. 1, and as best illustrated in Fig. 3, clamping means are provided to hold the barrel 25 against the base member 10. This clamping means consists of a pivotal clamping lever 63 having a substantially horizontal end portion 64 adapted to fit over the edge of annular flange 26, and an upwardly inclined handle portion 65. Turning the clamping lever 63 to the position shown in Fig. 3 will force the annular flange 26 of the barrel 25 firmly against the annular ring 27 of the base member 10. A suitable slot 66 is provided in the barrel casing 54 to permit the lever to be turned in or out of engagement with the flange 26. Although but one clamping means has been illustrated in the drawings, it should be understood that there are actually two such members, with one being located on either side of the barrel. Each lever 63 is mounted on a cylindrical supporting member 67 which is welded to the base 10. Each of these levers 63 is held against its support 67, for free pivotal movement thereon, by means of a bolt 68 and a nut 69, as shown. Fixed handles 70 (shown only in end view in Fig. 1) screwed into the flange 53 at opposite sides of the barrel may be used to assist in the lifting of the barrel assembly, including casing and hoppers, after the clamping means 63 have been released.

At the left-hand side of Fig. 1 is shown a panel board 71 having various controls thereon for regulating the speed of the drive shaft 23, the speed of the motor 15, and the amounts of heat dissipated by the various heater elements 30, 31, 32 and 33. These control means are well known items of standard merchandise and form no part of this invention.

A better understanding of the above described invention should be obtained from a description of its operation, as follows: Plastic material, in solid pellet or powdered form, is loaded into the hopper 12 (or, more specifically, into the inner hopper 55). The feed screw 22 is caused to rotate after the heaters have been brought to their required temperatures. The plastic material will be forced downwardly by the upper screw flight 34 into the lower portion of the barrel. At the same time, reverse flight 35 will force plastic material upwardly from the bottom of the barrel and fold it back on further descending material in the space opposite outlet 28 creating a compression zone as well as a kneading action. Furthermore the opposite forces of the two screw flights tend to equalize the axial thrust on the screw 22 which means that the drive mechanism (not shown) can be simplified accordingly.

As a result of the compression and heating of the plastic material, the latter has become plasticized or molten in the zone opposite the outlet 28. Also, since this material is under compression, it will be extruded from the orifice opening of the orifice member 14 into the bath 13. The resulting rod or strip of extruded plastic material can be directed along the length of water bath 13 into the bite of rollers 16 and 17. Suitably weighted immersion rollers (not shown) located adjacent the opposite ends of the water bath may be employed to hold the extruded material under the surface of the water. The speed of roller 16, as determined by the appropriate control setting for motor 15, can be adjusted in accordance with the rate of extrusion to pull the material through the water bath. In some instances, the speed of roller 16 may be regulated to control the ultimate thickness of the extruded product. The speed of feed screw 22 and the settings for the various heaters may be varied in accordance with the physical characteristics of the plastic material being extruded.

During the feeding process, air passing through openings, such as slots 66 (Fig. 1) or openings 75 (Fig. 2), into the annular space between the casing 54 and the barrel 25 will become heated. This hot air will rise upwardly through holes 61 and 60 into the space between the two hopper members, so as to warm the outer surface of the inner hopper 55. The net effect of this passage of hot air will be evidenced by a pre-heating or drying of the material in the hopper. The hot air is permitted to escape through holes 62 in the outer hopper 56.

If additional pre-heating of the plastic material is required or desired, a source of air pressure may be applied to the hollow tube 51 through the swivel connection 52. Air will pass downwardly through the center of the hollow tube 51 into the lower portion of the cavity 43. This air, absorbing heat from the feed screw 22, will pass upwardly in the cavity 43 (on the outside of tube 51) through the bore 47 of the cap 42, through the channels 48, and out of the ports 49 into the body of the plastic material in the hopper. This stream of hot air will pre-heat or dry the plastic material by direct contact. The rate of air flow through the ports 49 can be varied by regulating the pressure of the air supplied to the tube 51.

With the arrangement shown in the drawings, it may be observed that the feed screw (including screw flight 35 and agitator vanes 45) projects upwardly into the hopper. As a result of this relationship, the feeding actually commences in the hopper itself. In addition, agitator vanes 45 constantly stir up the material to prevent any agglomeration or clogging within the hopper as well as facilitating the drying operation.

Also, the vertical arrangement of this extruder permits a simple separation of the barrel member from its associated feed screw by means of clamping lugs 63; such a feature would be otherwise impossible in the conventional horizontal type of extruder. After the lugs 63 have been turned to their releasing positions, the entire barrel assembly, including the hoppers and barrel casing, may be lifted up to expose the feed screw for inspection or cleaning.

The embodiment of this invention, as set forth in the drawings, has been described in particular reference to an extruding system. As indicated above, the device of this invention could be adapted for use in connection with a plastic molding machine, in which instance this device would form the feeding mechanism for such a machine.

Also, this invention has been described in relation to the extrusion and molding of materials commonly referred to as "plastic" material. It should be apparent, however, that the device of this invention could be employed in connection with other fusible materials, such as finely-divided glass, various rubber compounds, lead, tin, zinc and many other materials which melt or may be plasticized at relatively low temperatures.

It will be obvious that other changes and modifications, apart from those described or suggested herein, may be made within the scope and spirit of this invention. Therefore, it is intended that the above description of the instant invention should be interpreted in an illustrative rather than a limiting sense.

Having thus described my invention what I claim as novel and desire to secure by Letters Patent of the United States is:

1. Apparatus for plasticizing a solid particulate material for purposes of extruding or molding the same and comprising in combination, a substantially vertical barrel, a hopper connected with the barrel to introduce the material thereto, means for heating the barrel to fuse the material therein, a hollow rotatable screw disposed in the bore of the barrel and having upper convolutions arranged to feed the material downwardly when the screw is rotated in one direction and also having lower convolutions of opposite hand, the said upper and lower opposite hand convolutions terminating at points spaced from each other along the screw and barrel and defining therewith a mixing chamber wherein the material is kneaded and folded upon itself, means defining a discharge passage in the barrel communicating with said mixing chamber, a head supported on the upper end of the said screw, and a tube supported by said head extending from said hopper into the interior of the hollow screw, the said tube being adapted for connection with a source of air under pressure to introduce pressurized air to the interior of the screw for warming therein, and the said head being provided with passage means for the circulation of the warmed air from the interior of the screw to the particulate material in the hopper whereby moisture is removed from the said material.

2. Apparatus for plasticizing a solid particulate material for purposes of extruding or molding the same and comprising in combination, a substantially vertical barrel, a hopper connected with the barrel to introduce the material thereto, means for heating the barrel to fuse the material therein, a hollow rotatable screw disposed in the bore of the barrel and having upper convolutions arranged to feed the material downwardly when the screw is rotated in one direction and also having lower convolutions of opposite hand, the said upper and lower opposite hand convolutions terminating at points spaced from each other along the screw and barrel and defining therewith a mixing chamber wherein the material is kneaded and folded upon itself, means defining a discharge passage in the barrel communicating with said mixing chamber, a head supported on the upper end of said screw within the hopper having a plurality of vanes for agitating the material in the hopper during rotation of the screw, and a tube supported by said head and projecting from said hopper into the interior of the hollow screw, the said tube being adapted for connection with a source of air under pressure to submit air to the hollow screw for warming, and the said head being provided with a plurality of passages for the flow of warmed air from the interior of the screw to the particulate material in the hopper so as to remove moisture therefrom.

3. Apparatus for plasticizing a solid particulate material for purposes of extruding or molding the same and comprising in combination, a substantially vertical barrel, a hopper connected with the barrel to introduce the material thereto, means for heating the barrel to fuse the material therein, a rotatable screw disposed in the bore of the barrel and having upper convolutions arranged to feed the material downwardly when the screw is rotated in one direction and also having lower convolutions of opposite hand, the said upper and lower opposite hand convolutions terminating at points spaced from each other along the screw and barrel and defining therewith a mixing chamber wherein the material is kneaded and folded upon itself, means defining a discharge passage in the barrel communicating with said mixing chamber, and a casing surrounding said barrel and said hopper which is closed at the bottom and closed at the top but which is provided with a plurality of openings adjacent its bottom end and top end for the circulation of air therethrough, the said air being heated by the barrel so as to heat the hopper and pre-heat the particulate material therein.

4. Apparatus for plasticizing a solid particulate material for purposes of extruding or molding the same and comprising in combination, a substantially vertical barrel, a hopper connected with the barrel to introduce the material thereto, means for heating the barrel to fuse the material therein, a hollow rotatable screw disposed in the bore of the barrel and having upper convolutions arranged to feed the material downwardly when the screw is rotated in one direction and also having lower convolutions of opposite hand, the said upper and lower opposite hand convolutions terminating at points spaced from each other along the screw and barrel and defining therewith a mixing chamber wherein the material is kneaded and folded upon itself, means defining a discharge passage in the barrel communicating with said mixing chamber, a head supported on the upper end of the said screw, a tube supported by said head extending from said hopper into the interior of the hollow screw, the said tube being adapted for connection with a source of air under pressure to introduce pressurized air to the interior of the screw for warming therein, and the said head being provided with passage means for the circulation fo the warmed air from the interior of the screw to the particulate material in the hopper whereby moisture is removed from the said material, and a casing surrounding said barrel and said hopper which is closed at the bottom and closed at the top but which is provided with a plurality of openings adjacent its bottom end and top end for the circulation of air therethrough, the said air being heated by the barrel so as to heat the hopper and pre-heat the particulate material therein 5. Apparatus for plasticizing a solid particulate material for purposes of extruding or molding the same and comprising in combination, a substantially vertical barrel, a hopper connected with the barrel to introduce the material thereto, means for heating the barrel to fuse the material therein, a hollow rotatable screw disposed in the bore of the barrel and having upper convolutions arranged to feed the material downwardly when the screw is rotated in one direction and also having lower convolutions of opposite hand, the said upper and lower opposite hand convolutions terminating at points spaced from each other along the screw and barrel and defining therewith a mixing chamber wherein the material is kneaded and folded upon itself, means defining a discharge passage in the barrel communicating with said mixing chamber, a head supported on the upper end of said screw within the hopper having a plurality of vanes for agitating the material in the hopper during rotation of the screw, a tube supported by said head and projecting from said hopper into the interior of the hollow screw, the said tube being adapted for connection with a source of air under pressure to submit air to the hollow screw for warming, and the said head being provided with a plurality of passages for the flow of warmed air from the interior of the screw to the particulate material in the hopper so as to remove moisture therefrom, and a casing surrounding said barrel and said hopper which is closed at the bottom and closed at the top but which is provided with a plurality of openings adjacent its bottom end and top end for the circulation of air therethrough, the said air being heated by the barrel so as to heat the hopper and pre-heat the particulate material therein.

6. Apparatus for plasticizing a solid particulate material for purposes of extruding or molding the same and comprising in combination, a barrel, a hopper connected with the barrel to introduce the material thereto, means for heating the barrel to fuse the material therein, a hollow rotatable screw disposed in the bore of the barrel and having convolutions arranged to feed the material in the barrel when the screw is rotated, means defining a discharge passage in the barrel to receive the material fed by the screw, a head supported on the end of the screw and projecting into said hopper, and a tube supported by said head extending from said hopper into the interior of the hollow screw, the said tube being adapted for connection with a source of air under pressure to introduce pressurized air to the interior of the screw for warming therein, and the said head being provided with passage means for the circulation of the warmed air from the interior of the screw to the particulate material in the hopper whereby moisture is removed from the said material.

7. Apparatus for plasticizing a solid particulate material for purposes of extruding or molding the same and comprising in combination, a substantially vertical barrel, a hopper connected with the barrel to introduce the material thereto, means for heating the barrel to fuse the material therein, a rotatable screw disposed in the bore of the barrel and having convolutions arranged to feed the material downwardly when the screw is rotated, means defining a discharge passage in the barrel to receive the material fed by the screw, and a casing surrounding said barrel and said hopper which is closed at the bottom and closed at the top but which is provided with a plurality of openings adjacent its bottom end and adjacent its top end for the circulation of air therethrough, the said air being heated by the barrel so as to heat the hopper and pre-heat the particulate material therein.

References Cited in the file of this patent

UNITED STATES PATENTS

| | | |
|---|---|---|
| 2,011,055 | Klugh | Aug. 13, 1935 |
| 2,499,398 | Lyon | Mar. 7, 1950 |
| 2,509,014 | Payne et al. | May 23, 1950 |
| 2,653,348 | Elgin et al. | Sept. 29, 1953 |
| 2,686,335 | Gross | Aug. 17, 1954 |
| 2,766,534 | Schaub et al. | Oct. 16, 1956 |

FOREIGN PATENTS

| | | |
|---|---|---|
| 930,773 | France | Aug. 25, 1947 |